US010534095B2

(12) United States Patent
Yang (10) Patent No.: US 10,534,095 B2
(45) Date of Patent: Jan. 14, 2020

(54) RADIATION DETECTOR TO DETERMINE A DEPTH OF INTERACTION AND METHOD OF USING THE SAME

(71) Applicant: SAINT-GOBAIN CERAMICS & PLASTICS, INC., Worcester, MA (US)

(72) Inventor: Kan Yang, Livingston, NJ (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 16/002,658

(22) Filed: Jun. 7, 2018

(65) Prior Publication Data

US 2018/0356539 A1 Dec. 13, 2018

Related U.S. Application Data

(60) Provisional application No. 62/517,121, filed on Jun. 8, 2017.

(51) Int. Cl.
*G01T 1/20* (2006.01)
*G01T 1/202* (2006.01)
(Continued)

(52) U.S. Cl.
CPC .......... *G01T 1/2023* (2013.01); *G01T 1/1642* (2013.01); *G01T 1/2002* (2013.01);
(Continued)

(58) Field of Classification Search
CPC ... G01T 1/2023; G01T 1/2002; G01T 1/2018; G01T 1/208; G01T 1/1642; G01T 1/2006
(Continued)

(56) References Cited

U.S. PATENT DOCUMENTS 6,413,311 B2 7/2002 Melcher et al.
7,601,963 B2 10/2009 Aykac et al.
(Continued)

FOREIGN PATENT DOCUMENTS

KR 20110111646 A 10/2011
KR 20130040473 A 4/2013

OTHER PUBLICATIONS

Moszyński et al., "Energy Resolution of LGSO Scintillators," IEEE NSS-MIC Conference, Oct. 2006, p. 64, San Diego, US.
(Continued)

*Primary Examiner* — David P Porta
*Assistant Examiner* — Gisselle M Gutierrez
(74) *Attorney, Agent, or Firm* — Abel Schillinger, LLP; Robert N. Young (57) ABSTRACT

A radiation detector can include a logic element configured to determine a depth of interaction based on a decay time corresponding to a radiation event and a constituent concentration profile of a radiation-sensing member. In another aspect, a method of detecting radiation can include determining a depth of interaction based on a decay time corresponding to a radiation event and a constituent concentration profile of a radiation-sensing member. The radiation detector and method can be useful in applications where depth of interaction is significant. The radiation-sensing member may include a variety of different materials, and is particularly well suited for alkali metal halides.

19 Claims, 5 Drawing Sheets

(51) Int. Cl.
G01T 1/164 (2006.01)
G01T 1/208 (2006.01)
(52) U.S. Cl.
CPC ............ *G01T 1/2006* (2013.01); *G01T 1/208* (2013.01); *G01T 1/2018* (2013.01)
(58) Field of Classification Search
USPC ........................................................ 250/395
See application file for complete search history.

(56) References Cited

U.S. PATENT DOCUMENTS

| | | | | |
|---|---|---|---|---|
| 7,775,507 B2* | 8/2010 | Niknafs | ................... | B01J 19/30 |
| | | | | 261/94 |
| 8,084,742 B1* | 12/2011 | Nagarkar | .............. | G01T 1/2008 |
| | | | | 250/363.03 |
| 8,399,843 B2* | 3/2013 | Menge | .................. | G01T 1/1644 |
| | | | | 250/367 |
| 8,405,035 B1* | 3/2013 | Nagarkar | .............. | G01T 1/2008 |
| | | | | 250/361 R |
| 8,866,089 B2* | 10/2014 | Perna | .................... | G01T 1/2006 |
| | | | | 250/366 |
| 9,164,181 B2* | 10/2015 | Menge | .................... | G01T 1/202 |
| 2006/0226368 A1 | 10/2006 | Srivastava et al. | | |
| 2009/0140150 A1 | 6/2009 | Ivan et al. | | |
| 2015/0090888 A1* | 4/2015 | Yang | ........................ | G01T 1/20 |
| | | | | 250/362 |
| 2017/0283696 A1* | 10/2017 | Yang | .................... | C09K 11/628 |
| 2018/0066185 A1* | 3/2018 | Boatner | ............. | C09K 11/7733 |

OTHER PUBLICATIONS

Yamamoto et al., "A GSO depth of interaction detector for PET," IEEE Transactions on Nuclear Science, Jul. 1998, pp. 1078-1082, vol. 45, No. 3. ((abstract only)).

Casey et al., "Investigation of LSO crystals for high spatial resolution position emission tomography," IEEE Nuclear Science Symposium Conference Record, 1996. ((abstract only)).

International Search Report and Written Opinion for PCT/US2018/036473, dated Sep. 12, 2018, 14 pages.

* cited by examiner

FIG. 7

RADIATION DETECTOR TO DETERMINE A DEPTH OF INTERACTION AND METHOD OF USING THE SAME

CROSS-REFERENCE TO RELATED APPLICATIONS

The present application claims priority under 35 U.S.C. § 119(e) to U.S. Provisional Patent Application No. 62/517,121, filed on Jun. 8, 2017, entitled "Radiation Detector to Determine a Depth of Interaction and Method of Using the Same," naming as an inventor Kan Yang, which is assigned to the current assignee hereof and is incorporated by reference herein in its entirety.

FIELD OF THE DISCLOSURE

The present disclosure is directed to radiation detectors that are configured to determine depths of interaction in response to receiving targeted radiation and methods of using such radiation detectors.

BACKGROUND

Radiation detectors that are designed for imaging applications may need to have the ability to determine the depth of interaction within a radiation-receiving member in order to properly render an image. Many times, the depth of interaction is based on an electronic pulse that corresponds to light output from the radiation-receiving member in response to capturing radiation. Further improvements in imaging with radiation detectors are desired.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Group numbers corresponding to columns within the Periodic Table of Elements based on the IUPAC Periodic Table of Elements, version dated Nov. 28, 2016.

The term "rare earth" or "rare earth element" is intended to mean Y, Sc, and the Lanthanoid elements (La to Lu) in the Periodic Table of the Elements.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

The depth of interaction within a radiation-sensing member can be obtained by using a decay time and constituent concentration profile within a radiation-sensing member. The decay time may be a function of a constituent concentration within a material. For example, the decay time for LiyNa(1-y)I:Tl, where 0<y<1, can increase as the Li content (y increases) within LiyNa(1-y)I:Tl, where 0<y<1. A radiation-receiving member can have a constituent concentration profile for a particular constituent within material, for example a dopant, an activator, or the like. For example, the Li content may increase or decrease along a depth of a radiation-sensing member. Such information can be used to correlate the decay to a particular content of the particular constituent, which in turn can be used to determine the depth at which such particular content is found. The depth of interaction will be at or very close to such a depth. The concepts as described herein may be useful for many different materials and constituents, and is particular useful for alkali metal halides. The concepts will be better understood after reading the specification in conjunction with the figures.

Figure 1:
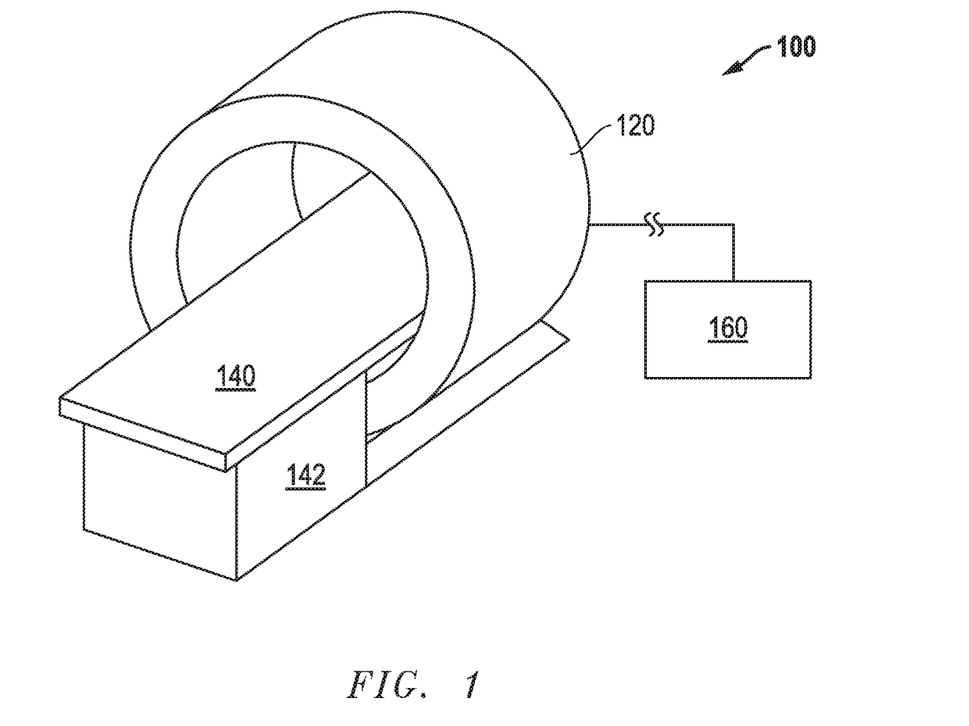
FIG. 1 includes an illustration of a radiation detector in accordance with an embodiment that can be used in medical imaging.

FIG. 1 includes an illustration of a radiation detector 100. In the embodiment as illustrated, the radiation detector 100 includes a radiation detection section 120 that includes radiation-sensing members and photosensors. A patient or an animal (not illustrated) to be imaged may be placed on the platform 140 that is supported by a base 142. The patient or animal or a portion of the patient or animal can be inserted into the radiation detection section 120 after a radiation-emitting chemical has been ingested or injected into the patient or animal. Radiation emitted from the patient or animal can be captured by radiation-sensing members within the radiation section 120. The radiation-sensing members can emit scintillation light that is received by the photosensors, which can generate electronic pulses in response to receiving the scintillation light. The electronic pulses are transmitted from the photosensors in the radiation detection section 120 and received by an apparatus 160 that can process the electronic pulses to produce useful information. The apparatus 160 can be an analyzer, imaging equipment, a computer or the like. In the embodiment as illustrated, the radiation detector 100 includes a medical imaging apparatus. In another embodiment, the radiation detector 100 can be another imaging apparatus or another apparatus where depth of interaction of radiation within the radiation-sensing members is significant.

Figure 2:
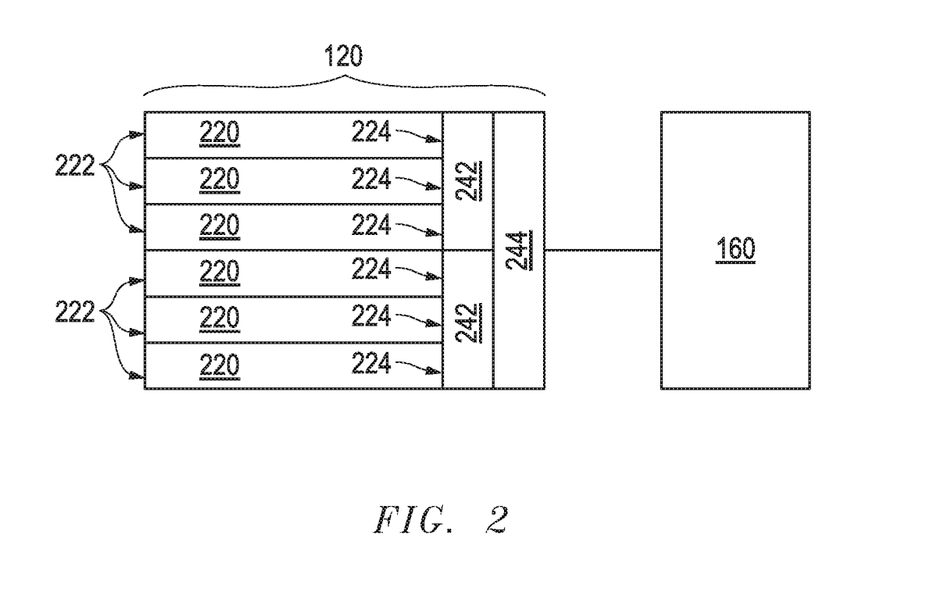
FIG. 2 includes an illustration of an enlarged cross-sectional view of a radiation detection section of the radiation detector of FIG. 1.

FIG. 2 includes an illustration of a portion of the radiation detector 100. The radiation detector can include an array of radiation-sensing members 220 have radiation-receiving ends 222 and photosensor ends 224, opposite the radiation-receiving ends 222. The photosensor ends 224 are optically coupled to the photosensors 242. Although not illustrated, reflectors may surround each or a set of the radiation-sensing members 220. The photosensors 242 are coupled to an optional fixture 244, which in turn is coupled to the apparatus 160. In another embodiment, the photosensors 242 can be coupled to the apparatus 160 without the fixture 244. The array radiation-sensing members 220 can be arranged in a two-dimensional configuration or a three-dimensional configuration. For a three-dimensional configuration, the radiation-sensing members can be oriented in a radial direction from a center of the radiation detection section 120. In such an embodiment, the radiation-sensing members 220 may be splayed, such that the radiation-receiving ends 222 are closer to other radiation-receiving ends 222 of neighboring radiation-sensing members 220, as compared to the photosensor ends 224 relative to other photosensor ends 224, which are opposite the radiation-receiving ends 224. The photosensors 242, their configuration, or both may be different whether a two-dimensional or three-dimension array is used.

The radiation-sensing members 220 have lengths that lie along a line that is substantially perpendicular to surfaces along the photosensor ends 224 of the radiation-sensing members 220. As used herein, substantially perpendicular is intended to mean that a line or a plane intersects another line or plane at an angle in a range of 80° to 110°. In an embodiment, the lengths of the radiation-sensing members are at least 3 mm, at least 11 mm, at least 36 mm, at least 74 mm, or at least 101 mm. The concepts as described herein are well suited for longer radiation receiving members, such as radiation-sensing members having lengths of at least 74 mm, although the concepts can be used with radiation-sensing members having shorter lengths. In an embodiment, one or more of the radiation-sensing members 220 are less than 1000 mm long.

The radiation-sensing members 220 can include an alkali metal halide. In a particular embodiment, the radiation-sensing members 220 can include a material having a general formula of:

$A_y B_{(1-y)} X$: Ac, wherein:

A represents an alkali metal;

B represents an alkali metal different from A or a combination of alkali metals, wherein each alkali metal within the combination is different from A;

Ac is an activator;

X includes a halogen;

$0 < y < 1$.

In another embodiment, the radiation-sensing elements 220 can optionally include an element Me, wherein Me represents Mg, Ca, Sr, Ba, Sc, Bi, Y, La, Lu, or any combination thereof. In a particular embodiment, A is Li, B is Na, Ac is Tl, and X is I. In another particular embodiment, both A and B are present, and $0 < y \leq 0.08$, $0 < y \leq 0.04$, or $0 < y \leq 0.025$. The significance of content of A and B within the radiation-sensing members 220 is addressed later in this specification with respect to decay times. Ac has a concentration in the radiation-sensing elements 220 in a range of 0.01 mol % to 5 mol % Li that allows the radiation-receiving members 220 to emit scintillating light when capturing neutrons and when capturing gamma radiation. Thus, the radiation detector can be a dual mode detector. The radiation detector does not require a phoswich configuration. As used herein, a phoswich configuration is intended to mean that two or more scintillators are stacked along a line between a photosensor and a radiation source when in normal use during radiation detection. The scintillator closer (or closest) to the radiation source may be configured to respond to radiation at a lower (or lowest) energy level, and another scintillator farther (or farthest) from the radiation source may be configured to respond to radiation at a higher (or highest) energy level.

The radiation-sensing members 220 can be scintillation crystals formed using any one of a variety of crystal growing techniques including Bridgman, Czochralski, Kyropoulos, Edge-defined Film-fed Growth (EFG), Stepanov, or the like.

The photosensors 242 can be photomultiplier tubes (PMTs), semiconductor-based photomultiplier, an avalanche photodiode, a hybrid photosensor, or a combination thereof. As used herein, a semiconductor-based photomultiplier in intended to mean a photomultiplier that includes a plurality of photodiodes, wherein each of the photodiodes have a cell size less than 1 mm2, and the photodiodes are operated in Geiger mode. In practice, the semiconductor-based photomultiplier can include over a thousand of photodiodes, wherein each photodiode has a cell size in a range of 10 microns to 100 microns and a fixed gain. The output of the semiconductor-based photomultiplier is the sum signal of all Geiger mode photodiodes. The semiconductor-based photomultiplier can include silicon photomultiplier (SiPM) or a photomultiplier based on another semiconductor material. For a higher temperature application (e.g., higher than 125° C.), the other semiconductor material can have a wider bandgap energy than silicon. An exemplary material can include SiC, a Ga-Group V compound (e.g., GaN, GaP, or GaAs), or the like. An avalanche photodiode has a larger size, such as a light-receiving area of least 1 mm2 and is operated in a linear mode.

Figure 3:
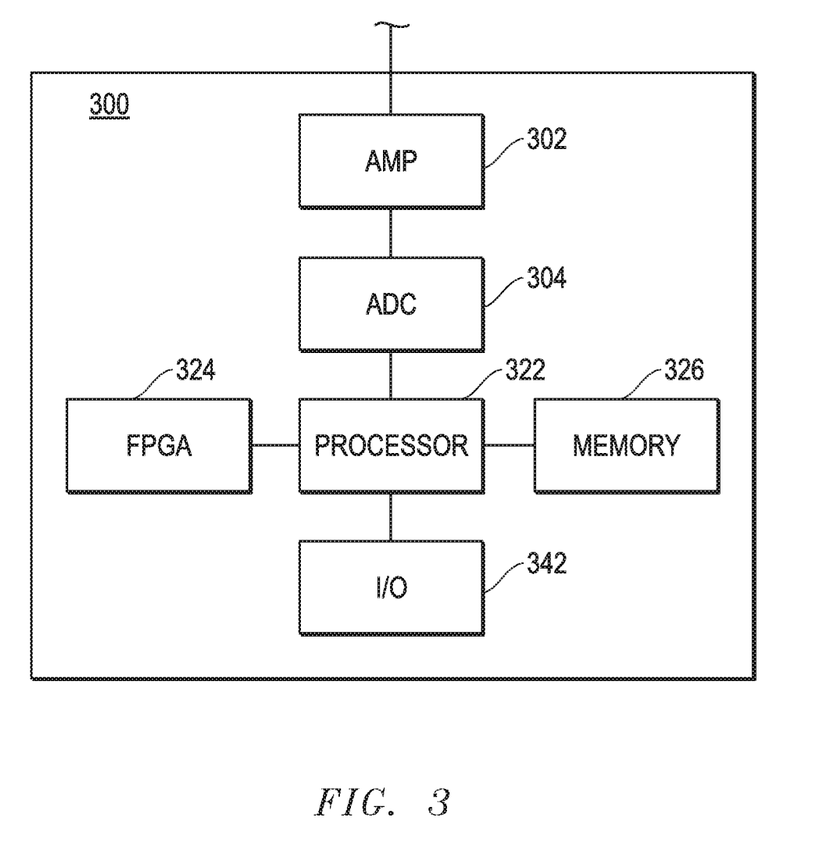
FIG. 3 includes a schematic depiction of an electronics module of the radiation detector of FIG. 1.

Electronic pulses from the photosensors 242 can be shaped, digitized, analyzed, or any combination thereof by the apparatus 160. The apparatus 160 can include an electronics module 300 that can include an amplifier, a preamplifier, a discriminator, an analog-to-digital signal converter, a photon counter, a pulse shape analyzer or discriminator, another electronic component, or any combination thereof. FIG. 3 includes a schematic diagram of an illustrative, non-limiting embodiment of the electronics module 300. As illustrated, an amplifier 302 is coupled to an analog-to-digital converter 304, which is coupled to a processor 322. In an embodiment, the amplifier 302 can be a high fidelity amplifier. The processor 322 can be coupled to a programmable/re-programmable processing module ("PRPM"), such as a field programmable gate array ("FPGA") 324 or application-specific integrated circuit ("ASIC"), a memory 326, and an input/output ("I/O") module 342. The couplings may be unidirectional or bidirectional. The functions provided by the components are discussed in more detail below. A logic element can include the processor 322, the FPGA 324, ASIC, another suitable component configured to perform logic or computational operation, or any combination thereof. In another embodiment, more, fewer, or different components can be used in the electronics module 300. For example, functions provided by the FPGA 324 may be performed by the processor 322, and thus, the FPGA 324 is not required. The FPGA 324 can act on information faster than the processor 322.

Figure 4:
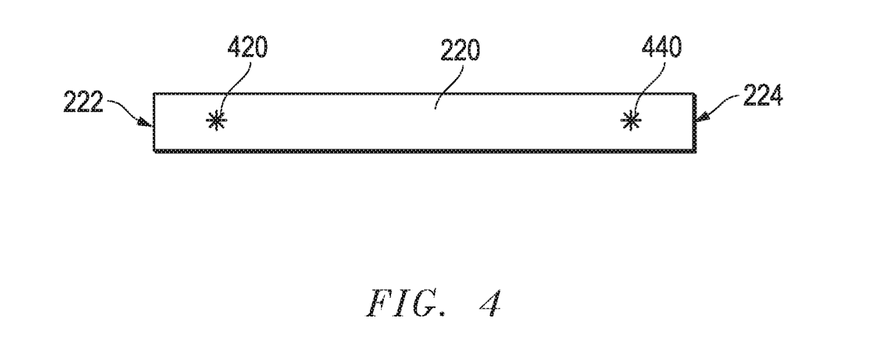
FIG. 4 includes an illustration of a radiation-sensing member and depictions of two particular locations where radiation may be captured within the radiation-sensing member.

Depth of interaction within the radiation-sensing members 220 can be useful in imaging applications. FIG. 4 illustrates one of the radiation-sensing members 220 having the radiation-receiving end 222 and the photosensor end 224. Targeted radiation can be captured at location 420 or at location 440. An accurate image can be produced when the location where targeted radiation is captured is known. Information from photosensors 242 can locate where the radiation is captured as seen from the perspective of the photosensor ends 224; however, the photosensors 242 may not be good at determining the depths of interaction, which are in a direction along the lengths of the radiation-sensing members 220.

Figure 5:
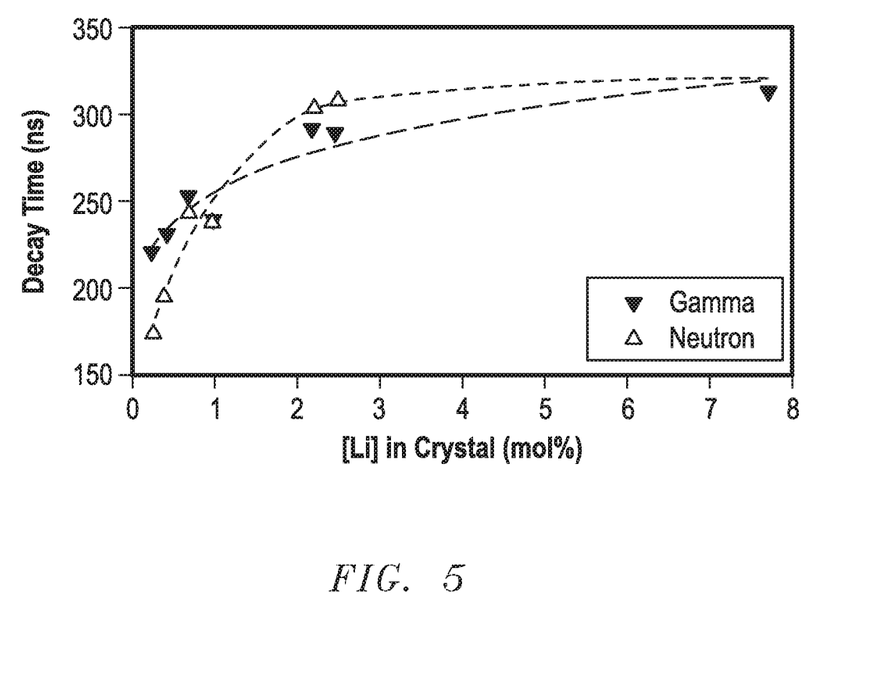
FIG. 5 includes a plot of decay time as a function of Li content within a radiation-receiving member includes LiyNa(1-y)I:Tl, where 0<y<1.

Rather than using light output, the depth of interaction within a radiation-sensing member 220 can be determined from a decay time combined with a composition profile of the radiation-sensing member 220 along its length. FIG. 5 includes a plot of primary decay time for a neutron or gamma radiation captured as a function of the composition of the radiation-sensing member 220. In a particular embodiment, the radiation-sensing member 220 includes LiyNa(1-y)I:Tl, where 0<y<1. When Li is not present, the formula simplifies to NaI:Tl and has a primary decay time of 230 ns for gamma radiation. The radiation-sensing member 220 does not detect neutrons with a formula of NAI:Tl. As the content of Li increases (y>0), neutrons can be detected, and the primary decay time for both neutrons and gamma radiation increases. The rate of increase in primary decay time increases significantly up to about y=0.025 (2.5 mol %). The rate of increase is significantly smaller for $0.025 \leq y \leq 0.04$ (2.5 mol % to 4 mol %), and increases at still a smaller rate for $0.04 \leq y \leq 0.08$ (4 mol % to 8 mol %). The change in primary decay time is a monotonic function and may be in the form of a line, such as a curve (illustrated in FIG. 5) or a straight line (semi-log or log-log plot of the data in FIG. 5). As described in more detail below, a decay time can be determined for captured targeted radiation, the decay time can have an associated content, and a corresponding constituent concentration profile of the radiation-sensing member 220 can be used to determine the depth of interaction, as described below in more detail.

Figure 6:
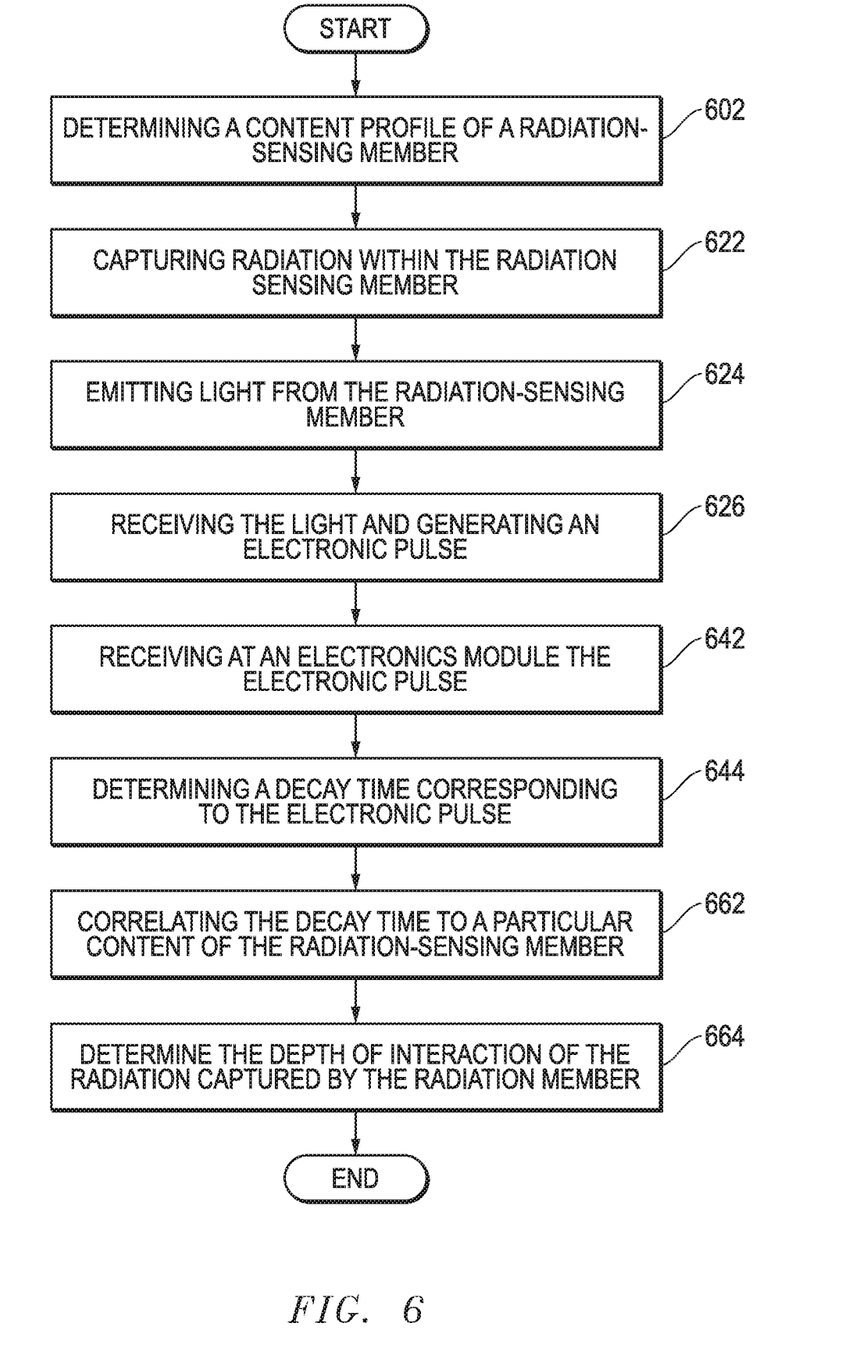
FIG. 6 includes a flow chart for a method of preparing data for and using the radiation detector of FIG. 1 in accordance with a particular embodiment.
Figure 7:
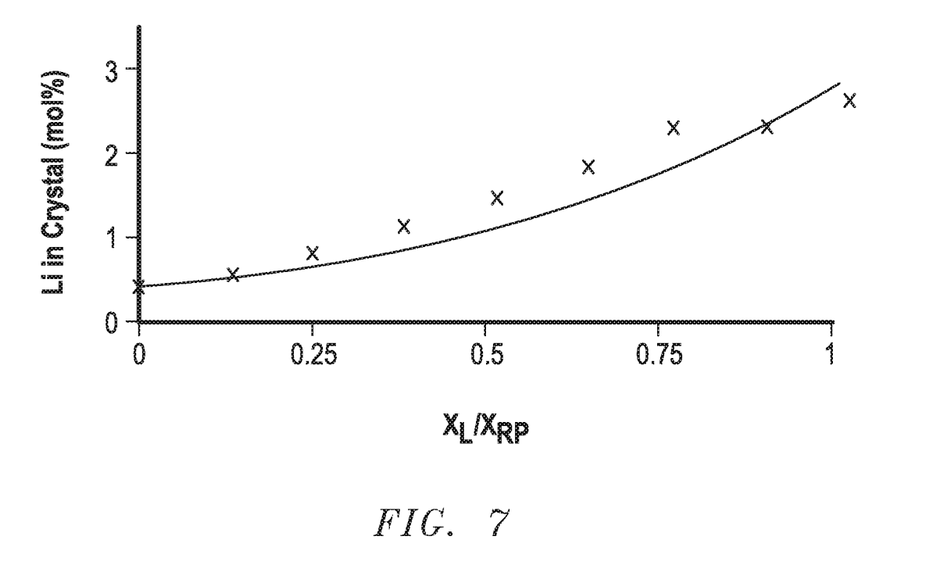
FIG. 7 includes a plot of Li content as a function of depth within a radiation-sensing member that includes LiyNa(1-y)I:Tl, where 0<y<1.

FIG. 6 includes an exemplary flow chart when using a radiation detector to determine depths of interaction for radiation captured by radiation-sensing members. When describing the method, reference will be made to FIGS. 1 to 3 and 6. The method includes determining a constituent concentration profile of a radiation-sensing member, at block 602. The radiation-sensing members 220 can be formed such that the content of a particular element changes along lengths of the radiation-sensing members 220. FIG. 7 includes an exemplary plot of Li content as a function of position along the length of one of the radiation-sensing members 220. The position is expressed as XL/XRP, where XL is the location along the length where the radiation is captured, and XRP is the length of the radiation-sensing member. As can be seen, the Li content increases as the distance from the radiation-receiving end 222 (XL/XRP=0) to the photosensor end 224 (XL/XRP=1) increases. In another embodiment (not illustrated), the Li content can decrease as the distance from the radiation-receiving end 222 to the photosensor end 224 increases. The constituent concentration profile may decrease or increase linearly or exponentially. In a particular embodiment, the constituent concentration profile is a monotonic function. The constituent concentration profiles can be in the form of an equation or as a set of positions along the length of the radiation-sensing member 220 and corresponding Li concentrations at such positions. The constituent concentration profiles can be obtained for some or all of the radiation-sensing members 220. For example, radiation-sensing members 220 obtained from the same boule may share the same constituent concentration profile. In another example, each radiation-sensing member 220 may have its own constituent concentration profile determined. Information regarding the constituent concentration profiles can be stored within the memory 326, programmed into the FPGA 324, or stored within persistent member outside of the electronics module 300.

The method can further include capturing radiation within a radiation-sensing member, at block 622, emitting light from the radiation-sensing member, at block 624, and receiving the light and generating an electronic pulse, at block 626. Radiation can be received by radiation-sensing members 220 at their radiation-receiving ends 222, and the radiation can be captured within the radiation-sensing members 220. Scintillation light can be emitted in response to capturing the radiation. For LiyNa(1-y)I:Tl, the targeted radiation is gamma radiation and neutrons, and scintillation light can be emitted when either is captured by the radiation-sensing members 220. The scintillation light is transmitted from the radiation-sensing members 220 and received by the photosensors 242. When the photosensors 242 are position-sensitive photosensors, the photosensors 242 can determine which particular radiation-sensing member 220 captured the radiation, and potentially the location where the radiation was captured in a plane substantially perpendicular to the length of the particular radiation sensing member 220. The electronic pulse generated from the photosensor 242 and position information, if available, can be transmitted from the photosensor 242 to apparatus 160 for further processing by the electronics module 300. At this point in the process, the location of where the radiation was captured can be expressed in two dimensions, and not in the third dimension, which corresponds to the depth of interaction. In the following paragraphs, the description addresses how the logic element can determine the depth of interaction.

Referring to FIG. 3, the electronic pulse can be amplified by the amplifier 302 before reaching a logic element. When the logic element is configured to work with analog signals, the electronic pulse can be received by the logic element without converting the electronic pulse to a digital signal. When the logic element is configured to work with digital signals, the electronic pulse can be converted to a digital signal before it is received by the logic element. Thus, the amplified electronic pulse can be optionally converted to a digital signal by the analog-to-digital converter 304. In another embodiment, the converter 304 is not used. In the description below, the logic element will operate on the digital signal.

After the converter 304, the digital signal can be received by the logic element. In an embodiment, the logic element can be processor 322, and thus, the processor 322 may operate on the digital signal. In another embodiment, the logic element can be the FPGA 324, and the digital signal can be transmitted from the processor 322 to the FPGA 324. The FPGA 324 can include a look-up table and determine which entry or entries correspond most closely to the digital signal. In a further embodiment, the logic element can be outside the electronics module 300, and thus, the digital signal can be transmitted from the processor 322 to the I/O 342, which can allow the digital signal to pass to a computer or another apparatus capable of processing or analyzing the digital signal.

The method can include determining a decay time corresponding to the electronic pulse, at block 644. The decay time can be determined to be the time that elapsed when the scintillation light is at or near its peak light output until the time the light output is 1/e times the peak light output (or about 36.8% of the peak light intensity). The determination can be performed by the processor 322 or a computer (not illustrated) external to the electronics module 300.

The method can further include correlating the decay time to a particular content of the radiation-sensing member, at block 662. Referring to FIG. 5, the change in decay time as a function of Li content is steeper when the content is at most about 2.5 mol % Li. Thus, the determination for the depth of interaction may be easier when the concentration varies from 0.2 mol % to 2.5 mol % Li, as compared to 2.5 mol % and higher concentrations of Li. Still, such higher concentrations can be used without deviating from the concepts as described in this specification. Data used to correlate Li content to decay time, such as in FIG. 5, can be obtained during a calibration or other similar sequence before the method begins. Returning to the method, the correlation for the current radiation event may be performed by the logic element. In a particular embodiment, the correlation may be performed using a look-up table. The table may be stored within the FPGA 324. The FPGA 324 may make the correlation faster than another logic element. In a further embodiment, the look-up table may be stored with the member 326, and the processor 322 can access the table and make the correlation. In another embodiment, the correlation may be in the form of an equation where the content of the radiation-sensing member 220 is expressed as a function of decay time. The equation may be stored in the member 326, and the processor 322 can read and use the equation to make the correlation. In a particular embodiment, the Li content in LiyNa(1-y)I:Tl, where 0<y<1, can be obtained using the data in FIG. 5.

The method can include determining the depth of interaction of the radiation captured by the radiation-sensing member, at block 664. The particular content information obtained from the prior action (block 662) can be correlated to a position along the length of the radiation-sensing member. Such information may be stored in a look-up table that may be stored within the FPGA 324. The FPGA 324 may make the determination faster than another logic element. In a further embodiment, the look-up table may be stored with the member 326, and the processor 322 can access the table and make the correlation. In another embodiment, the correlation may be in the form of an equation where the position along the length is expressed as a function of the constituent concentration profile within the radiation-sensing member 220. The equation may be stored in the member 326, and the processor 322 can read and use the equation to make the correlation. In a particular embodiment, the Li content in LiyNa(1-y)I:Tl, where 0<y<1, can be obtained using the data in FIG. 7.

Accordingly, the location of the radiation event can be determined by using depth of interaction and other information obtained by the photosensor 242. The other information can include the identification of the particular radiation-sensing member 220 in which the radiation was captured and two-dimensional information of where the radiation was captured. The depth of interaction provides information regarding the third dimension. Thus, the location of where the radiation was captured can be accurately determined in three dimensions. The three-dimensional information can be used in generating an image regarding the radiation source.

The concepts as described herein are can be used for different types of radiation based at least in part on the composition of the radiation-sensing members 220. For example, radiation-receiving members 220 that include Li, B, or Gd can be used in dual mode detectors that can detect neutrons and gamma radiation. Although not illustrated, a neutron moderator can surround the radiation-receiving ends 222 and sides of the radiation-sensing members 200 to convert fast neutrons to thermal neutrons to increase the likelihood of detection of the neutrons. Other compositions may be used for other types of targeted radiation.

While many particular details have been described with respect to LiyNa(1-y)I:Tl, wherein 0<y<1, the concepts described herein are not limited to this particular material. The concepts may be extended to other compounds, activators, and dopants. For example, the use of a decay time and constituent concentration profile to determine a depth of interaction can be extended to other alkali metal halides, and potentially other materials.

Embodiments described herein can provide a relatively quick and easy method of determining depth of interaction within a radiation-receiving member. A radiation-sensing member can be analyzed to determine the constituent concentration profile of a particular constituent. This information along with a decay time and a correlation between the decay time and constituent concentration profile provides a depth of interaction. The concepts can be extended to many different types of radiation-sensing materials and used in many different applications where depth of interaction is significant, such as imagining applications.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

A radiation detector including: a logic element configured to: determine a depth of interaction based on a decay time corresponding to a radiation event and a constituent concentration profile of a first radiation-sensing member.

Embodiment 2

The radiation detector of Embodiment 1, further including the first radiation-sensing member.

Embodiment 3

The radiation detector of Embodiment 1 or 2, wherein the logic element includes a processor.

Embodiment 4

The radiation detector of any one of Embodiments 1 to 3, wherein the logic element includes a field programmable gate array or an application-specific integrated circuit.

Embodiment 5

The radiation detector of any one of Embodiments 1 to 4, further including a photosensor.

Embodiment 6

The radiation detector of Embodiment 5, wherein the photosensor is a solid-state photosensor.

Embodiment 7

The radiation detector of any one of Embodiments 1 to 6, further including an analog-to-digital converter, an amplifier, a filter, or any combination thereof.

Embodiment 8

A method of detecting radiation using a radiation detector, the method including: determining a depth of interaction based on a decay time corresponding to a radiation event and a constituent concentration profile of a first radiation-sensing member.

Embodiment 9

The method of Embodiment 8, further including receiving an electronic pulse corresponding to the radiation event, and determining the decay time from the electronic pulse.

Embodiment 10

The method of Embodiment 9, further including: capturing radiation within the first radiation-sensing member; emitting light from the first radiation-sensing member; and receiving at the photosensor the light from the first radiation-sensing member.

Embodiment 11

The radiation detector or the method of Embodiments 1 to 10, wherein the constituent concentration changes monotonically along a length of the first radiation-sensing member.

Embodiment 12

The radiation detector or the method of Embodiment 11, wherein the length of the first radiation-sensing member extends from a surface closer to a radiation-receiving end of the first radiation sensing member to an opposite surface of the first radiation-sensing member closer to a photosensor.

Embodiment 13

The radiation detector or the method of Embodiment 12, wherein the length of the first radiation-sensing member lies along a line that is substantially perpendicular to the radiation-receiving end of a photosensor.

Embodiment 14

The radiation detector or the method of any one of Embodiments 11 to 13, wherein the length is at least 4 mm, at least 11 mm, at least 36 mm, at least 74 mm, or at least 101 mm.

Embodiment 15

The radiation detector or the method of any one of Embodiments 1 to 14, wherein the first radiation-sensing member includes an alkali metal halide.

Embodiment 16

The radiation detector or the method of any one of Embodiments 1 to 15, wherein the first radiation-sensing member includes a material having a general formula of: $A_y B_{(1-y)} X$: Ac, wherein: A represents an alkali metal; B represents an alkali metal different from A or a combination of alkali metals, wherein each alkali metal within the combination is different from A; Ac is an activator; X includes a halogen; $0<y<1$.

Embodiment 17

The radiation detector of Embodiment 16, wherein the material further includes an element Me, wherein Me represents Mg, Ca, Sr, Ba, Sc, Bi, Y, La, Lu, or any combination thereof.

Embodiment 18

The radiation detector or the method of Embodiment 16 or 17, wherein A is Li, B is Na, Ac is Tl, and X is I.

Embodiment 19

The radiation detector or the method of any one of Embodiments 16 to 18, wherein $0<y\leq0.08$, or $0<y\leq0.04$, or $0<y\leq0.025$.

Embodiment 20

The radiation detector or the method of Embodiments 1 to 19, wherein the radiation detector is part of an imaging apparatus.

Embodiment 21

The radiation detector or the method of Embodiments 1 to 20, further including an array of radiation-sensing members, including the first radiation-sensing member.

Embodiment 22

The radiation detector or the method of Embodiments 1 to 20, wherein the first radiation-sensing member is monocrystalline.

Embodiment 23

A dual-mode radiation detector including: radiation-sensing members of the dual mode detector, each having: a radiation-receiving end and a photosensor end opposite the radiation-receiving end; a length extending between the radiation-receiving end and the photosensor end; and a constituent concentration gradient along the length of the radiation-sensing member; and a photosensor optically coupled to the radiation-sensing members, wherein the radiation detector does not have a phoswich configuration for the radiation-sensing members, and wherein the radiation detector is configured to determine a depth of interaction based on a decay time corresponding to a radiation event and the constituent concentration gradient of at least one of the radiation-receiving members.

Embodiment 24

The dual-mode radiation detector of Embodiment 23, wherein for each radiation-receiving member, the length of the radiation-sensing member is substantially perpendicular to a surface along the radiation-receiving end of the radiation-receiving member or a surface along the photosensor end of the radiation-receiving member.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detector comprising:
   a logic element configured to:
      determine a depth of interaction based on a monotonic decay time corresponding to a radiation event and a constituent concentration profile of a first radiation-sensing member,
   wherein the radiation sensing member comprises a material having a general formula of:

$A_y B_{(1-y)} X:Ac$, wherein:

A represents an alkali metal;
   B represents an alkali metal different from A or a combination of alkali metals, wherein each alkali metal within the combination is different from A;
   Ac is an activator;
   X includes a halogen; and $0<y<1$.

2. The radiation detector of claim 1, further comprising the first radiation-sensing member.

3. The radiation detector of claim 1, wherein the logic element comprises a processor, a field programmable gate array, or an application-specific integrated circuit.

4. The radiation detector of claim 1, further comprising a solid-state photosensor.

5. The radiation detector of claim 1, wherein the constituent concentration changes monotonically along a length of the first radiation-sensing member.

6. A method of detecting radiation using a radiation detector, the method comprising:
   determining a depth of interaction based on a decay time corresponding to a radiation event and a constituent concentration profile of a first radiation-sensing member, wherein the first radiation-sensing member comprises a material having a general formula of:

$A_y B_{(1-y)} X:Ac$, wherein:

A represents an alkali metal;
   B represents an alkali metal different from A or a combination of alkali metals, wherein each alkali metal within the combination is different from A;
   Ac is an activator;
   X includes a halogen; and
   $0<y<1$.

7. The method of claim 6, further comprising receiving an electronic pulse corresponding to the radiation event, and determining the decay time from the electronic pulse.

8. The method of claim 7, wherein the constituent concentration changes monotonically along a length of the first radiation-sensing member.

9. The method of claim 8, wherein the length of the first radiation-sensing member extends from a surface closer to a radiation-receiving end of the first radiation sensing member to an opposite surface of the first radiation-sensing member closer to a photosensor.

10. The method of claim 8, wherein the length is at least 4 mm.

11. The method of claim 8, wherein the length is at least 11 mm.

12. The method of claim 8, wherein the length is at least 74 mm.

13. The method of claim 8, wherein the length is at least 101 mm.

14. The method of claim 6, wherein A is Li, B is Na, Ac is Tl, and X is I.

15. The method of claim 6, wherein $0<y<0.08$.

16. The method of claim 6, wherein $0<y<0.025$.

17. The method of claim 6, further comprising an array of radiation-sensing members, including the first radiation-sensing member.

18. A dual-mode radiation detector comprising:
   radiation-sensing members of the dual mode detector, each having:
      a radiation-receiving end and a photosensor end opposite the radiation-receiving end;
      a length extending between the radiation-receiving end and the photosensor end; and a constituent concentration gradient along the length of the radiation-sensing member; and a photosensor optically coupled to the radiation-sensing members, wherein the radiation detector does not have a phoswich configuration for the radiation-sensing members, wherein the at least one of the radiation-sensing members comprises a material having a general formula of:

$A_y B_{(1-y)} X:Ac$, wherein:

A represents an alkali metal;

B represents an alkali metal different from A or a combination of alkali metals, wherein each alkali metal within the combination is different from A;

Ac is an activator;

X includes a halogen; and $0<y<1$, and wherein the radiation detector is configured to determine a depth of interaction based on a decay time corresponding to a radiation event and the constituent concentration gradient of the at least one of the radiation sensing members.

19. The dual-mode radiation detector of claim 18, wherein for each radiation-receiving member, the length of the radiation-sensing member is substantially perpendicular to a surface along the radiation-receiving end of the radiation-receiving member or a surface along the photosensor end of the radiation-receiving member.

* * * * *